UNITED STATES PATENT OFFICE.

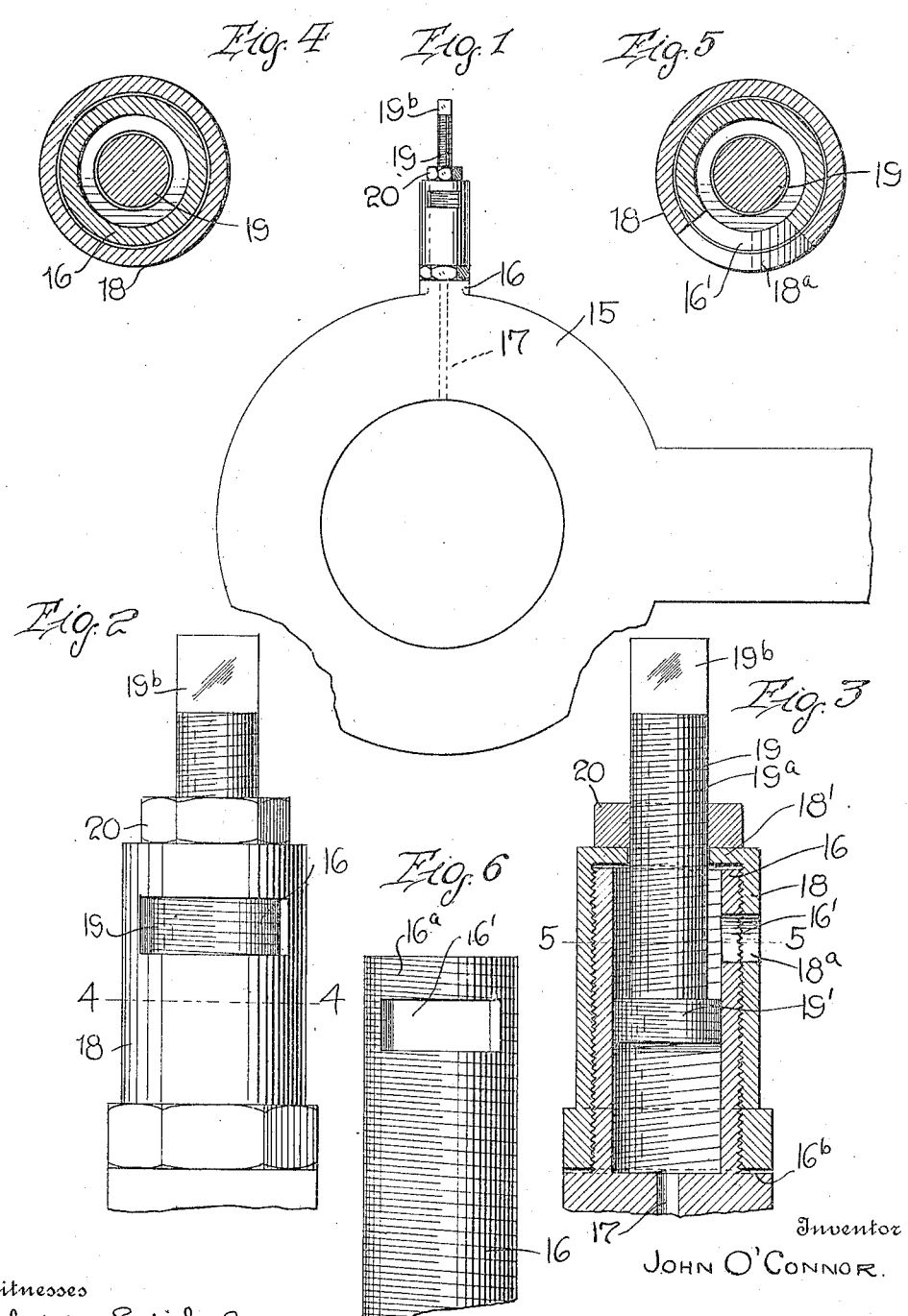

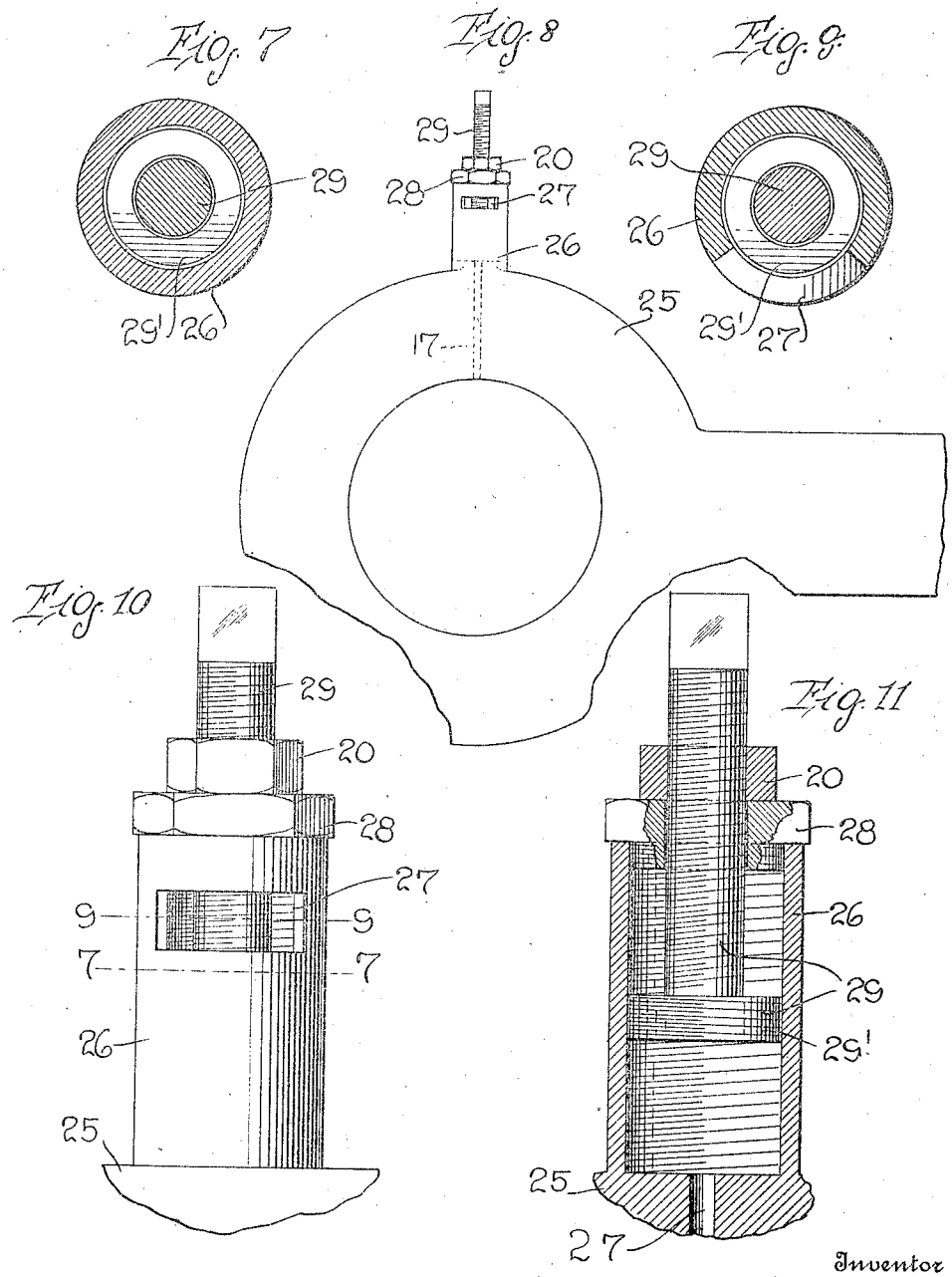

JOHN O'CONNOR, OF ATCHISON, KANSAS.

GREASE-CUP.

1,103,156.

Specification of Letters Patent.   Patented July 14, 1914.

Application filed September 17, 1913.   Serial No. 790,288.

*To all whom it may concern:*

Be it known that I, JOHN O'CONNOR, a citizen of the United States, residing at Atchison, in the county of Atchison and State of Kansas, have invented certain new and useful Improvements in Grease-Cups, of which the following is a specification, reference being had to the accompanying drawings.

This invention relates to grease-cups, and it more particularly relates to the class of grease-cups in which a semi-solid lubricating material is contained and pressed into contact with the journal or bearing to be lubricated.

One of the objects of this invention is to provide a grease-cup of this character in which the grease may be placed without removing any of the elements or adjuncts of the grease-cup.

Another object is to provide a grease cup of this character which is absolutely dust proof and in which all of the parts are so clamped into rigid relation with one another, as to avoid accidental relative movement thereof, thereby avoiding loss and accident. And another object is to generally improve, simplify and cheapen the construction of grease-cups of this character.

In the accompanying drawings which supplement this specification, Figure 1 illustrates somewhat diagrammatically a fragmental portion of a locomotive side link or connecting bar provided with one of my improved grease-cups; Fig. 2 is an enlarged side elevation view of the grease-cup illustrated in Fig. 1; Fig. 3 is an enlarged vertical sectional view through the grease-cup, the inlet openings being in registry; Fig. 4 is a horizontal sectional view on the line 4—4 of Fig. 2; Fig. 5 is a horizontal sectional view on the line 5—5 of Fig. 3; Fig. 6 is a fragmental detail view of the inner cylinder; Fig. 7 is a horizontal sectional view through a modified form of the device, the section being taken on the line 7—7 of Fig. 10; Fig. 8 is a view similar to Fig. 1 illustrating the modified form; Fig. 9 is a horizontal sectional view taken on the line 9—9 of Fig. 10; Fig. 10 is a view similar to Fig. 2 of a modified form of the invention; Fig. 11 is a fragmental vertical sectional view of the modified form.

Referring to these drawings in which similar reference characters correspond with similar parts throughout the several views, the bearing member 15 illustrated in Fig. 1 is formed with an upwardly extending externally and internally threaded cylinder 16, which is primarily open at its top, and communicates with the interior of the bearing 15 through the medium of an oil duct 17. The cylinder 16 is provided with a lateral opening 16′ adjacent to its top portion, a bridge 16ª extending over the opening and being exteriorly and interiorly screw threaded, the same as below the opening and at the lateral sides thereof. In other words, the opening intersects certain of the screw threads which extend from the top of the cylinder approximately to the bottom thereof.

An outer cylinder 18 is internally screw threaded and fitted over the external screw threads of the cylinder 16, the bottom of the cylinder 18 being adapted to fit snugly upon a shoulder 16ᵇ formed at the base of the cylinder 16, while the upper end of the outer cylinder is formed with an inwardly extending flange 18′ which is adapted to normally rest upon the upper end of the cylinder 16. The cylinder 18 is provided with an inlet opening or aperture 18ª, which is normally out of registry with the aperture 16′ and is adapted to be brought into registry therewith by rotating the outer cylinder through approximately 120 degrees.

A plunger 19 is provided with a screw threaded head 19′ and a screw threaded shank 19ª, the free end 19ᵇ of said shank being square or rectangular, for proper engagement with a wrench. The head 19′ is in screw threaded engagement with the interior surface of the cylinder 16, while a lock nut 20 is in screw threaded engagement with the exterior surface of the shank 19ª.

In operating and filling this grease cup, the lock nut 20 is first loosened so that the plunger 19 may be moved to its uppermost position with the head 19′ above the aperture 16′. The casing 18 is now rotated sufficiently to bring its aperture 18ª into registry with the aperture 16′, and the inner cylinder may now be filled through these registry apertures. When filled, the outer cylinder is turned into its normal position, so that the aperture 16′ and 18ª are out of registry, and it is obvious that if the plunger 19 is now screwed down, its head 19′ bears upon the grease and presses it through the duct 17. When a sufficient amount of grease has thus been applied, the lock nut 20 is tightened upon the flange 18', and this increases the friction between the plunger head and the inner cylinder, at the same time increasing the friction between the nut and the plunger and between the nut and outer cylinder, so that all of the parts of the grease cup are bound rigidly in place by means of the lock nut 20.

In the modified form illustrated in Figs. 7 to 11 inclusive, the member 25 corresponds with the member 15 in Fig. 1, a cylinder 26 being formed thereon and provided with an aperture 27 which communicates with the interior thereof. This cylinder is interiorly screw threaded from bottom to top and is provided with a closing cap 28 in screw threaded engagement with the inner wall of the cylinder 26. The plunger 29 is similar in all respects to the plunger 28 except that the plunger 29' is of greater diameter. This plunger head is in screw threaded engagement with the interior wall of the cylinder 26, while the screw threaded shank thereof is adapted to move freely through the cap or plug 28, and is provided with a lock nut 20.

It will be seen that when the plunger head 29' is in its uppermost position, the aperture 27 is open, so that lubricating material may be placed in the cylinder through said opening; whereupon the plunger may be screwed down, so as to press the lubricating material through the duct 17.

It is seen that I have provided an oil cup of this character which is fully capable of attaining the foregoing objects in a thoroughly practical and efficient manner.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A grease-cup consisting of a cylinder having its inner wall screw threaded from top to bottom and having a lubricating duct communicating with the bottom thereof and being provided with a lateral opening adjacent to its top, a plunger having a screw threaded head and a screw threaded shank, said screw threaded head being engaged with the internal threads of the cylinder, a screw threaded member engaged with the upper end of the cylinder, said threaded shank extending through said member, a lock nut in screw threaded engagement with said shank and normally resting on said member and co-acting therewith and with the shank for securely closing the upper end of the cylinder.

2. A grease-cup comprising an internally and externally screw threaded inner cylinder, an internally threaded outer cylinder provided with an inwardly extending flange which is normally seated on the top of the first said cylinder, said inner and outer cylinders being each provided with an opening near its upper end, said openings being normally out of registry and adapted to be moved into registry by rotating the outer cylinder on the threads of the inner cylinder, a plunger comprising a screw threaded head and a screw threaded shank, said head being adapted to be disposed on a plane above the openings of the cylinders and to be screwed down throughout the length of the inner cylinder, and a lock nut engaged with the threads of the shank and being normally seated on the flange of the outer cylinder and co-acting therewith and with said plunger for closing the end of the inner cylinder and securing the several elements of the grease cup in fixed position, substantially as specified.

3. A grease-cup comprising an inner cylinder provided with screw threads on its interior surface and being provided with a lateral opening near its top, an outer cylinder rotatably mounted on the inner cylinder and provided with a lateral opening adapted to be moved alternatively in and out of registry with the opening of the inner cylinder, a plunger having screw threaded engagement with the threads of the inner cylinder and adapted to be moved alternatively up and down therein, and a lock nut on the plunger and adapted to bear against the outer cylinder for binding the several elements of the grease cup in fixed relation with one another, substantially as specified.

In testimony whereof I hereunto affix my signature in the presence of two witnesses.

JOHN O'CONNOR.

Witnesses:
 FRANK ALDRICH,
 ED. O'CONNOR.